(12) United States Patent
Thomas

(10) Patent No.: US 12,042,862 B2
(45) Date of Patent: Jul. 23, 2024

(54) SYSTEMS AND METHODS FOR REFINING ADDITIVELY MANUFACTURED COMPONENTS

(71) Applicant: THE BOEING COMPANY, Chicago, IL (US)

(72) Inventor: Baily James Thomas, Berkeley, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 17/950,771

(22) Filed: Sep. 22, 2022

(65) Prior Publication Data
US 2024/0100600 A1   Mar. 28, 2024

(51) Int. Cl.
| | |
|---|---|
| B22F 10/60 | (2021.01) |
| B22F 10/10 | (2021.01) |
| B22F 10/28 | (2021.01) |
| B22F 12/41 | (2021.01) |
| B23K 26/06 | (2014.01) |
| B23K 26/342 | (2014.01) |
| B29C 64/153 | (2017.01) |

(Continued)

(52) U.S. Cl.
CPC .............. *B22F 10/60* (2021.01); *B22F 10/10* (2021.01); *B22F 10/28* (2021.01); *B22F 12/41* (2021.01); *B23K 26/0604* (2013.01); *B23K 26/342* (2015.10); *B29C 64/153* (2017.08); *B29C 64/165* (2017.08); *B29C 64/268* (2017.08); *B29C 64/30* (2017.08); *B29C 71/04* (2013.01); *B33Y 10/00* (2014.12); *B33Y 30/00* (2014.12); *B33Y 40/20* (2020.01)

(58) Field of Classification Search
CPC ... B22F 12/41; B23K 26/0604; B29C 64/268; B29C 71/04
See application file for complete search history.

(56) References Cited

U.S. PATENT DOCUMENTS

| | | | |
|---|---|---|---|
| 4,330,699 A | 5/1982 | Farrow | |
| 7,344,609 B2 * | 3/2008 | Statnikov | B23P 9/04 148/558 |

(Continued)

FOREIGN PATENT DOCUMENTS

CN   106475558   3/2017

OTHER PUBLICATIONS

"Grain refining of Ti—6Al—4V alloy fabricated by laser and wire additive manufacturing assisted with ultrasonic vibration," Yuan, et al., Ultrasonics Sonochemistry 73 (2021).

(Continued)

*Primary Examiner* — Timothy Kennedy
*Assistant Examiner* — Inja Song
(74) *Attorney, Agent, or Firm* — Joseph M. Butscher; The Small Patent Law Group LLC

(57) ABSTRACT

An additive manufacturing system and method include an additive manufacturing head including an energy emitter that is configured to emit energy into a material to form one or more portions of a component. An ultrasonic laser emitter is configured to emit ultrasonic laser energy onto a portion of the material to generate ultrasonic waves in relation to the portion of the material. The ultrasonic waves control development of one or both of microstructure or size of grains in relation to the portion of the material.

21 Claims, 3 Drawing Sheets

(51) Int. Cl.
  *B29C 64/165* (2017.01)
  *B29C 64/268* (2017.01)
  *B29C 64/30* (2017.01)
  *B29C 71/04* (2006.01)
  *B33Y 10/00* (2015.01)
  *B33Y 30/00* (2015.01)
  *B33Y 40/20* (2020.01)

(56) References Cited

U.S. PATENT DOCUMENTS

| | | | |
|---|---|---|---|
| 2005/0092397 A1* | 5/2005 | Statnikov | C21D 10/00 |
| | | | 148/400 |
| 2017/0059529 A1* | 3/2017 | Kamel | C21D 1/34 |
| 2017/0146489 A1* | 5/2017 | Redding | B29C 64/153 |
| 2019/0039318 A1* | 2/2019 | Madigan | B23K 15/02 |
| 2019/0093655 A1* | 3/2019 | Wu | F04C 29/04 |
| 2020/0016831 A1* | 1/2020 | Slattery | B22F 10/80 |
| 2022/0250159 A1* | 8/2022 | Kenworthy | B22F 10/14 |

OTHER PUBLICATIONS

"Frequency Control of Laser Generated Ultrasonic Waves," Alva, Iowa State University Digital Repository (2019).

\* cited by examiner

SYSTEMS AND METHODS FOR REFINING ADDITIVELY MANUFACTURED COMPONENTS

FIELD OF THE DISCLOSURE

Examples of the present disclosure generally relate to additive manufacturing systems and methods, and more particularly, to systems and methods for refining components formed through additive manufactured processes.

BACKGROUND OF THE DISCLOSURE

Additive manufacturing systems and methods are used to fabricate components (such as parts or products) through multiple layers of material. For example, known additive manufacturing systems and methods form a component by adding layer-upon-layer of material. Additive manufacturing systems and methods may include or otherwise use three dimensional (3D) modeling (for example, computer-aided design or CAD) software, computer-controlled additive-manufacturing equipment, and raw materials in powder or liquid form.

Additive manufacturing encompasses a wide variety of technologies and incorporates a wide variety of techniques, such as, for example, directed energy deposition (DED), laser freeform manufacturing (LFM), laser deposition (LD), direct metal deposition (DMD), laser metal deposition, laser additive manufacturing, laser engineered net shaping (LENS), stereolithography (SLA), selective laser sintering (SLS), fused deposition modeling (FDM), multi jet modeling (MJM), three-dimensional (3D) printing, rapid prototyping, direct digital manufacturing, layered manufacturing, and additive fabrication. Moreover, a variety of raw materials may be used in additive manufacturing to create products. Examples of such materials include plastics, metals, concrete, and glass.

One example of an additive-manufacturing system is a laser additive-manufacturing system. Laser additive manufacturing includes spraying or otherwise injecting a powder or a liquid into a focused beam of a high-power laser or nexus of a plurality of high-powered lasers under controlled atmospheric conditions, thereby creating a weld or melt pool. The resulting deposits may then be used to build or repair articles for a wide variety of applications. The powder injected into the high-power laser beam may include a wide variety of materials such as metal, plastic, and/or the like.

Articles formed by additive manufacturing may require surface processing to provide a more desirable product. One example of surface processing includes smoothing or otherwise reducing the roughness of the product's surface. Surfaces produced by known additive manufacturing systems and methods may have rough surface finishes, for example, on the order of about 600-1500 microinches Ra. Such rough surfaces may have several undesirable effects. For example, components having a rough surface finish have limited applications in cyclical-loading environments due to stress risers typically associated with high surface roughness. Additionally, rough surfaces may impede the use of cost-saving, non-destructive inspection systems because rough surface finishes generate high levels of noise in such systems. When used on parts having relatively smooth surfaces, non-destructive inspection methods are widely recognized as cost-effective and accurate tools for identifying structural deficiencies in such parts.

To improve the surface finish of a component fabricated with additive-manufacturing equipment, separate post-processing steps are typically undertaken at a processing location using conventional surface-finishing equipment and techniques. However, due to the complexity of some parts, post-processing of surfaces may be cumbersome, expensive, and time consuming. In addition, conventional post-processing surface-finishing methods may be ineffective for reducing the surface roughness of the interior surfaces of some complex parts, resulting in products with less than desirable properties.

With respect to powder-based DED Additive Manufacturing, grain morphology deposited material can be undesirable. For example, the deposited material can include large grains and columnar grains. One known method applies ultrasonic vibrations through a baseplate or via direct contact with the deposited material. However, such methods are constrained by size and geometry. In particular, as a component is built, thereby increasing in size and complexity, vibrations emitted into the baseplate can have a reduced effectiveness. Further, ultrasonic vibrations generated via contact with the deposited material typically are also restricted based on the geometry of the deposited material. If a build geometry is too complex, the contact method of producing ultrasonic vibrations may hinder a build strategy, and/or the vibrations may not adequately reach the targeted surfaces of the deposited material.

SUMMARY OF THE DISCLOSURE

A need exists for a system and a method for refining a surface of a material formed through an additive manufacturing process. Further, a need exists for a system and a method for disrupting undesirable grain growth on a material during an additive manufacturing process, such as a directed energy deposition process.

With those needs in mind, certain examples of the present disclosure provide an additive manufacturing system including an additive manufacturing head having an energy emitter that is configured to emit energy into a material to form one or more portions of a component. An ultrasonic laser emitter is configured to emit ultrasonic laser energy onto a portion of the material to generate ultrasonic waves in relation to the portion of the material. The ultrasonic waves control development of grain microstructure and/or size in relation to the portion of the material.

In at least one example, the ultrasonic laser emitter is off-axis from the energy emitter.

In at least one example, the ultrasonic laser emitter is separate and distinct form the energy emitter.

In at least one example, the energy emitter is a laser emitter, and the energy is one or more laser beams.

In at least one example, the material is one or both of a powder or a liquid.

In at least one example, the ultrasonic laser emitter is configured to emit the ultrasonic laser energy onto the portion of the material that trails a melt pool formed by the energy emitted from the energy emitter into the material.

In at least one example, the ultrasonic laser emitter is spaced apart from the material.

In at least one example, the ultrasonic laser emitter follows behind the energy emitter.

The additive manufacturing system can also include a housing that couples the additive manufacturing head to the ultrasonic laser emitter.

The additive manufacturing head can also include one or more nozzles configured to emit the material.

Certain examples of the present disclosure provide an additive manufacturing method, including emitting energy, from an energy emitter of an additive manufacturing head, into a material to form one or more portions of a component; and emitting ultrasonic laser energy, from an ultrasonic laser emitter, onto a portion of the material to generate ultrasonic waves in relation to the portion of the material. The ultrasonic waves control development of one or both of microstructure or size of grains in relation to the portion of the material.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the present disclosure provide systems and methods configured to eliminate, minimize, or otherwise reduce undesirable grain morphology components formed through additive manufacturing processes, such as directed energy deposition additive manufacturing processes. In at least one example, an energy emitter is configured to disrupt one or more areas proximate to a melt pool to produce desirable grain refinement. The use of laser ultrasonics allows for the introduction of ultrasonic waves proximate to the melt pool (such as behind the melt pool after an energy emitter has emitted energy into the melt pool to form a portion of a component), thereby avoiding the limitations posed by size and geometrical complexity. In at least one example, an ultrasonic laser emitter emits an ultrasonic laser beam proximate to the melt pool, off-axis from a fixture attached to a deposition head allowing for continual ultrasonic wave generation near the melt pool and the potential grain refinement of the entire build.

Figure 1:
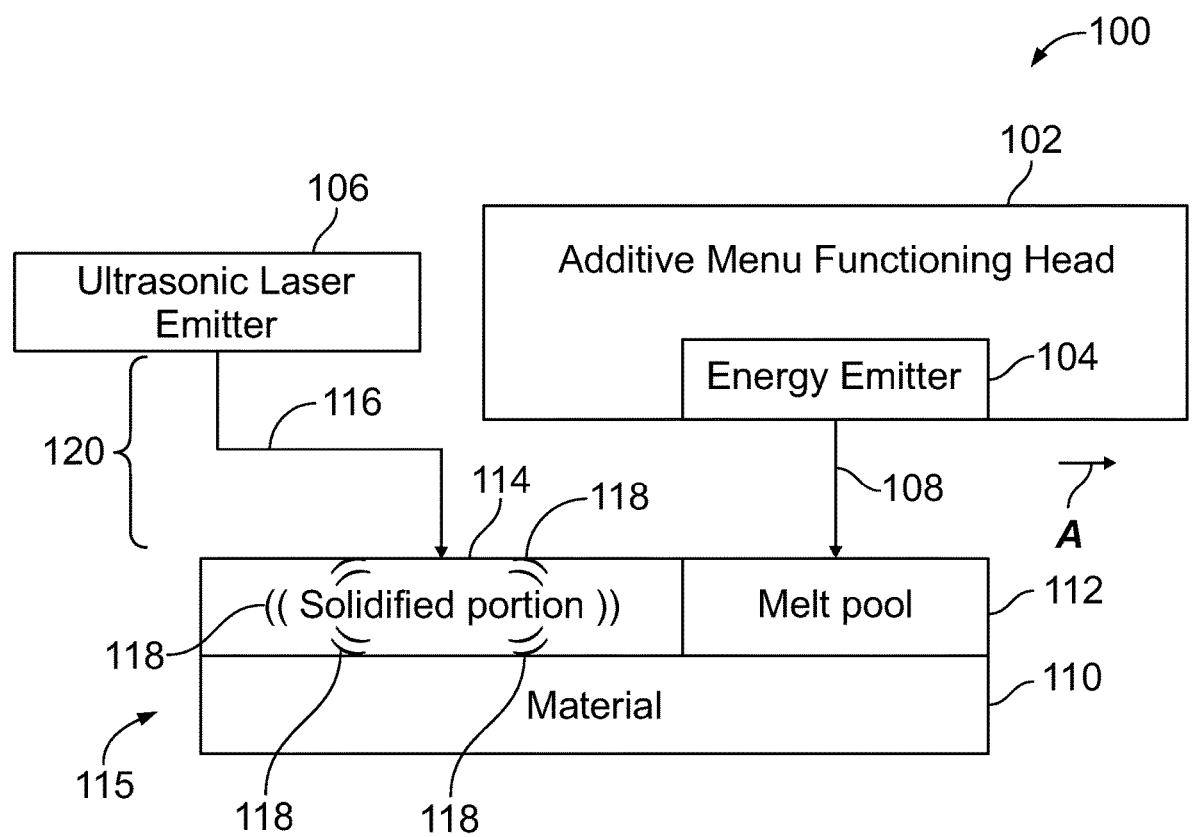
FIG. 1 illustrates a block diagram of an additive manufacturing system, according to an example of the present disclosure.

FIG. 1 illustrates a block diagram of an additive manufacturing system 100, according to an example of the present disclosure. The additive manufacturing system 100 includes an additive manufacturing head 102 including an energy emitter 104. The additive manufacturing system 100 also includes an ultrasonic laser emitter 106 that is separate and distinct from the energy emitter 104.

In at least one example, the energy emitter 104 is a laser emitter, such as a laser scanner that emits one or more laser beams. Optionally, the energy emitter 104 can be an electron beam scanner that emits one or more electron beams. As another example, the energy emitter 104 can be an arcing scanner that emits electrical arcing energy.

In at least one example, the additive manufacturing system 100 is a directed energy deposition additive manufacturing system in which the energy emitter 104 is a laser emitter that is configured to emit energy, such as a laser beam 108, into a material 110. For example, the material 110 can be a powder or liquid, which can be deposited from the additive manufacturing head 102 through one or more nozzles. As another example, the material 110 can be a powder or liquid retained within a retaining vessel (such as a powder bed). The material 110, such as a powder and/or a liquid, can include a wide variety of materials such as metal(s), and/or plastic(s).

The energy emitter 104, such as a laser emitter, emits the focused laser beam 108 into the material, thereby creating a melt pool 112. As the additive manufacturing head 102 moves in the direction of arrow A, portions of the material previously in the melt pool 112 cool and solidify into a solidified portion 114, which trails the melt pool 112. The solidified portion 114 ultimately forms as at least a portion of a component or part that is formed through the directed energy deposition process.

The additive manufacturing head 102 is configured to emit energy, such as one or more laser beams, into and/or onto the material 110 to form a component from the material 110. For example, the additive manufacturing head 102 is configured to selectively laser sinter layers of the material 110 onto an existing layer of material to form the component.

In order to control growth of grains (for example, control development of grain microstructure and/or size) on the solidified portion 114, the ultrasonic laser emitter 106 emits ultrasonic laser energy 116 onto the solidified portion 114 behind the melt pool 112 (that is, behind the laser beam 108 forming the melt pool 112). The ultrasonic laser energy 116 is configured generate ultrasonic waves 118 that refine the grains into smaller structure, in contrast to larger columnar grains. In at least one example, the ultrasonic laser emitter 106 is off-axis from the energy emitter 104. For example, the ultrasonic laser emitter 106 follows behind the energy emitter 104 and is not coaxial therewith. In at least one example, during motion of the additive manufacturing head 102, motion of the energy emitter 104 leads in front of the ultrasonic laser emitter 106. In this manner, the ultrasonic laser emitter 106 emits the ultrasonic laser energy 116 onto one or more portions of the solidified portion 114 behind or otherwise trailing the melt pool 112 (instead of portion of the material 110 in front of the melt pool 112 before the energy emitter 104 emits the energy 108 thereon). Alternatively, the ultrasonic laser emitter 106 can be coaxial with the energy emitter 104 and configured to emit the ultrasonic laser energy 116 directly into the melt pool 112, instead of the solidified portion 114 that trails the melt pool 112.

The ultrasonic laser emitter 106 is spaced apart from the material 110. The ultrasonic laser emitter 106 is also spaced apart from any vessel that retains the material 110. As such, the ultrasonic laser emitter 106 does not contact the material, either directly or indirectly through a retaining vessel. Instead, the ultrasonic laser emitter 106 emits the ultrasonic laser energy 116 from a separation distance. As the ultrasonic laser energy 116, such as one or more ultrasonic laser beams, impinges on the solidified portion, a temperature of the solidified portion 114 increases (that is, the solidified portion 114 heats up), expands, and contracts, thereby generating ultrasonic waves 118 in relation to (such as through and/or on surfaces of) the solidified portion 114. The ultrasonic waves 118 remove, prevent, hinder, or otherwise reduce the presence of undesired protrusions, such as grain growth, on the solidified portion 114. In this manner, the ultrasonic laser emitter 106 is configured to refine a surface of a component formed through the additive manufacturing head 102.

As noted, the ultrasonic laser emitter 106 follows the additive manufacturing head 102 as the energy emitter 104 emits the laser beam 108 into the material 110 to form the melt pool 112. In at least one example, the ultrasonic laser emitter 106 is coupled to the additive manufacturing head 102, such as through a linked coupling (for example, one or more brackets, one or more beams, a carriage, and/or the like). Optionally, the ultrasonic laser emitter 106 can be separated from the additive manufacturing head 102.

The energy emitter 104 can be a laser emitter, which is configured to emit laser energy, such as one or more laser beams, to form the melt pool 112. The laser emitter can be operated at a first power, such as 1000-4500 Watts, for example. The ultrasonic laser emitter 106 can be operated at a second power that can be higher than the first power. For example, the second power can be 500-3,000 Watts, for example. In at least one example, the ultrasonic laser emitter 106 emits the ultrasonic laser energy 116 as a 1 nanosecond pulsed laser beam having a 1 micron wavelength. Optionally, the ultrasonic laser emitter 106 can emit the ultrasonic laser energy as a pulsed laser at more or less than 1 nanosecond with a wavelength that is greater or less than 1 micron.

The additive manufacturing head 102 can be used to form a component, via the material 110, through directed energy deposition (DED). The ultrasonic laser emitter 106 emits the ultrasonic laser energy 116 in relation to the material 110 (such as the solidified portion 110 that trails the melt pool 112) to generate the ultrasonic waves 118 into the material 114, thereby disrupting grain growth in relation to the material 110 as a component is formed from the material 110. The ultrasonic laser emitter 106 does not contact the material 110, either directly, or indirectly through a retaining vessel. Instead, the ultrasonic laser emitter 106 emits the ultrasonic laser energy onto the material 110 over a separation distance 120, which is or otherwise includes a space between the ultrasonic laser emitter 106 and the material 110.

Optionally, the additive manufacturing head 102 can be used to form a component, via the material 110, through laser freeform manufacturing (LFM), laser deposition (LD), direct metal deposition (DMD), laser metal deposition, laser additive manufacturing, laser engineered net shaping (LENS), stereolithography (SLA), selective laser sintering (SLS), fused deposition modeling (FDM), multi jet modeling (MJM), three-dimensional (3D) printing, rapid prototyping, direct digital manufacturing, layered manufacturing, and/or the like.

As described herein, the additive manufacturing system 100 includes the additive manufacturing head 102 including the energy emitter 104 (such as a first laser emitter) that is configured to emit energy, such as the laser beam 108, into the material 110 to form one or more portions of a component 115. The ultrasonic laser emitter 106 (for example, a second laser emitter that differs from the first laser emitter) is configured to emit ultrasonic laser energy 116 onto a portion of the material 110 (such as the solidified portion 114 trailing the melt pool 112) to generate ultrasonic waves 118 in relation to the portion of the material 110. The ultrasonic waves 118 control development (for example, prevent, eliminate, minimize, or otherwise reduce) of one or both of microstructure or size of grains in relation to the portion of the material 110.

Figure 2:
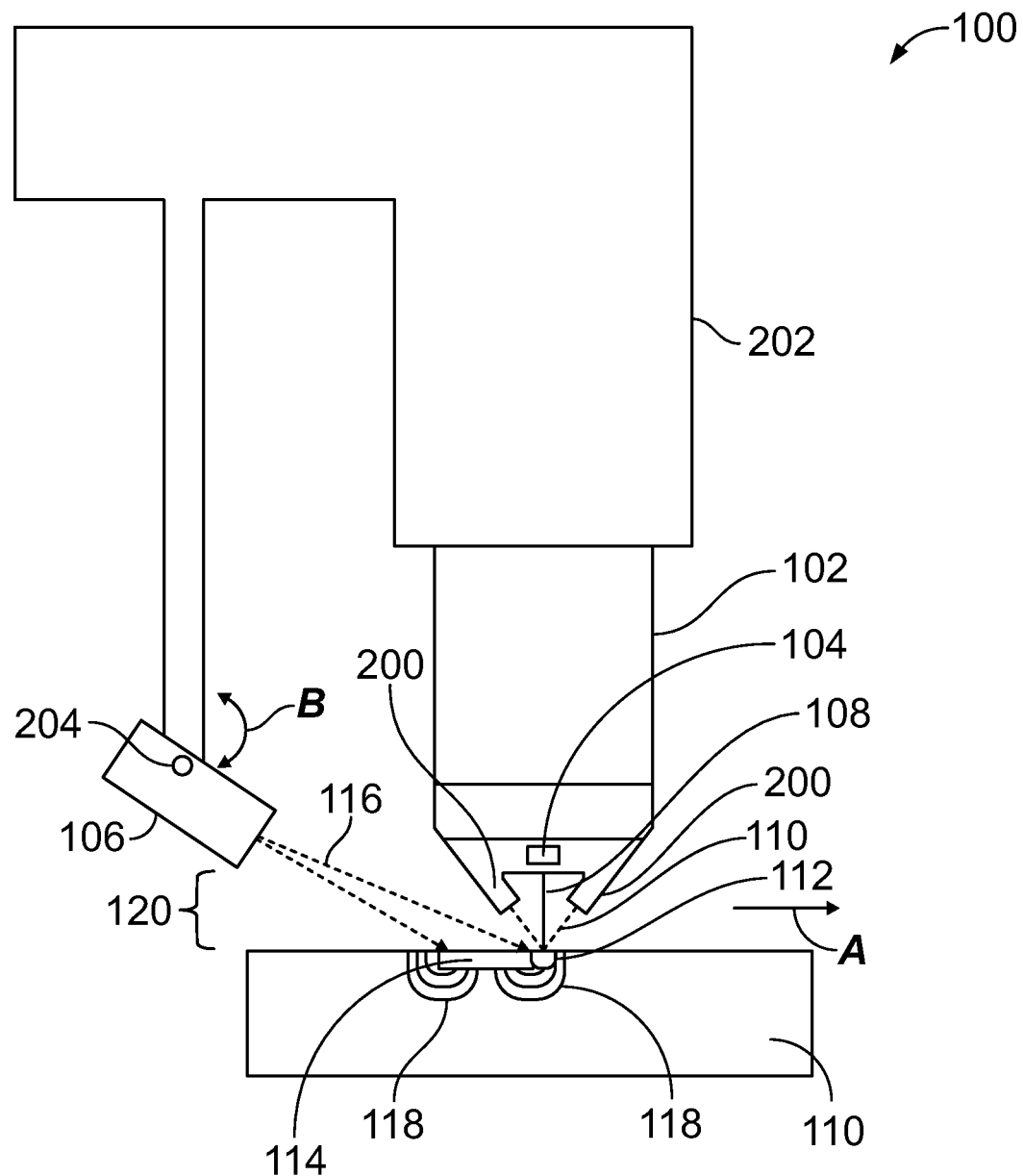
FIG. 2 illustrates a simplified schematic diagram of an additive manufacturing system, according to an example of the present disclosure.

FIG. 2 illustrates a simplified schematic diagram of the additive manufacturing system 100, according to an example of the present disclosure. In at least one example, the additive manufacturing head 102 includes the energy emitter 104 in the form of a laser emitter that emits the laser beam 108 into the material 110 to form the melt pool 112. In at least one further example, the additive manufacturing head 102 also includes one or more nozzles 200 that emit the material 110 (such as a powder or liquid) therefrom.

As shown, the ultrasonic laser emitter 106 can be coupled to the additive manufacturing head 102 through a housing 202, such as carriage. The ultrasonic laser emitter 106 can be secured a fixed distance from the energy emitter 104 to ensure that the ultrasonic laser emitter 106 trails the energy emitter 104 the fixed distance as the additive manufacturing head 102 advances in the direction of arrow A.

The ultrasonic laser emitter 106 emits the ultrasonic laser energy 116 onto the solidified portion 114 of the material 110 that trails the melt pool 112. The ultrasonic laser energy 116 generates the ultrasonic waves 118 in relation to the material 110, such as the solidified portion 114, thereby reducing grain growth. In at least example, the ultrasonic laser emitter 106 can be pivotally coupled to the housing 202 at a pivot axle 204. The ultrasonic laser emitter 106 can pivot about the pivot axle 204 in the directions of arc B to scan or otherwise move the ultrasonic laser energy 116 over the surface of the solidified portion 114. In at least one other example, the ultrasonic laser emitter 106 is fixed in relation to the housing 202 and is not configured to pivot.

Figure 3:
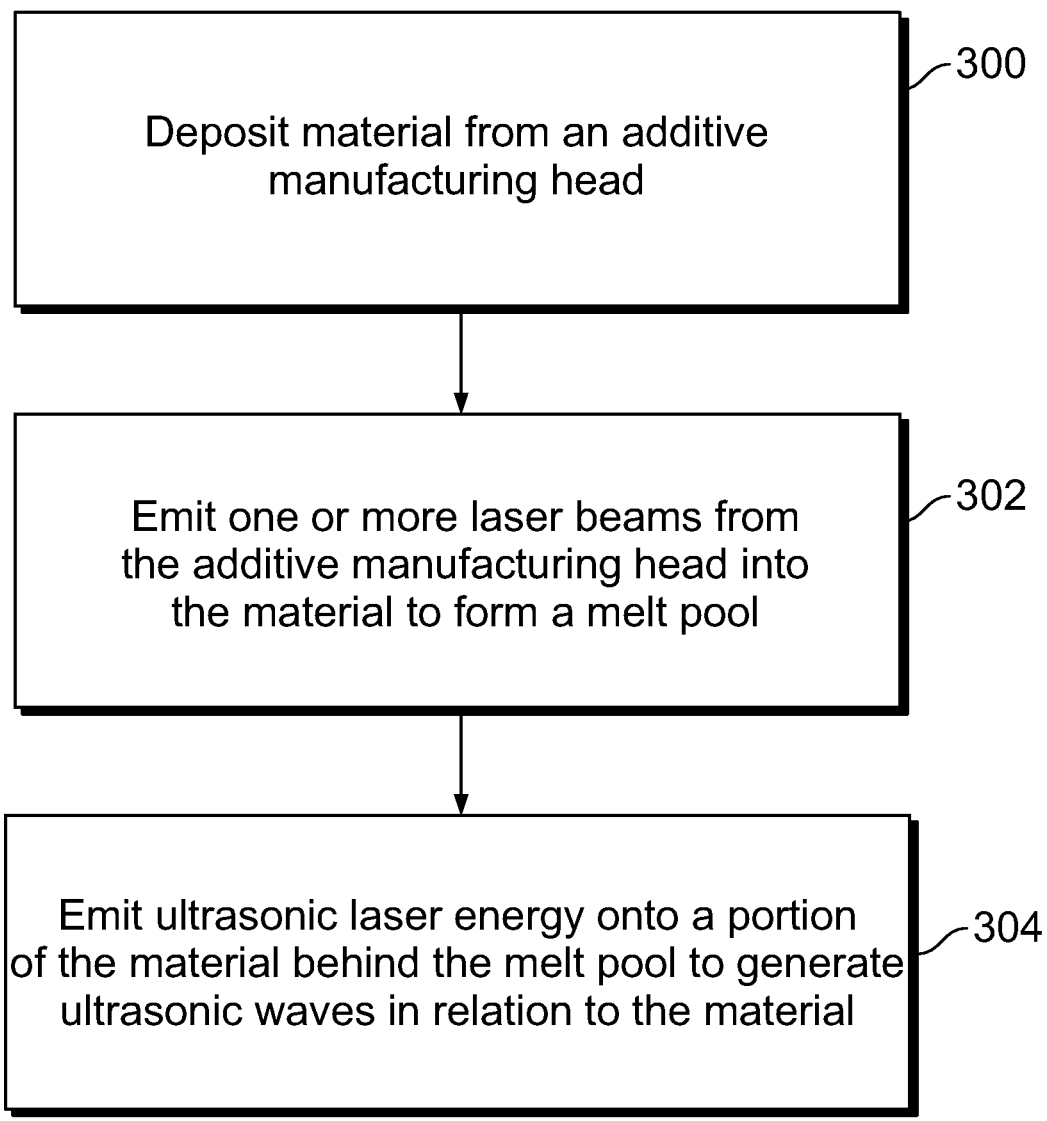
FIG. 3 illustrates a flow chart of an additive manufacturing method, according to an example of the present disclosure.

FIG. 3 illustrates a flow chart of an additive manufacturing method, according to an example of the present disclosure. Referring to FIGS. 1-3, at 300, material 110 is deposited, such as from the nozzles 200 of the additive manufacturing head 102. At 302, one or more laser beams 108 are emitted from the additive manufacturing head 102 (for example, the energy emitter 104) into the material 110 to form the melt pool 112. At 304, ultrasonic laser energy 116 is emitted from the ultrasonic laser emitter 106 (which is separate and distinct from the energy emitter 104) onto a portion of the material 110 (such as the solidified portion 114) behind the melt pool 112 to generate the ultrasonic waves 118 in relation to the material 110, thereby controlling development of microstructure and/or size of grains (for example, preventing, eliminating, minimizing, or otherwise reducing) in relation to the material 110.

Further, the disclosure comprises examples according to the following clauses:

Clause 1. An additive manufacturing system, comprising:
an additive manufacturing head including an energy emitter that is configured to emit energy into a material to form one or more portions of a component; and
an ultrasonic laser emitter configured to emit ultrasonic laser energy onto a portion of the material to generate ultrasonic waves in relation to the portion of the material, wherein the ultrasonic waves control development of one or both of microstructure or size of grains in relation to the portion of the material.

Clause 2. The additive manufacturing system of Clause 1, wherein the ultrasonic laser emitter is off-axis from the energy emitter.

Clause 3. The additive manufacturing system of Clauses 1 or 2, wherein the ultrasonic laser emitter is separate and distinct form the energy emitter.

Clause 4. The additive manufacturing system of any of Clauses 1-3, wherein the energy emitter is a laser emitter, and the energy is one or more laser beams.

Clause 5. The additive manufacturing system of any of Clauses 1-4, wherein the material is one or both of a powder or a liquid.

Clause 6. The additive manufacturing system of any of Clauses 1-5, wherein the ultrasonic laser emitter is configured to emit the ultrasonic laser energy onto the portion of the material that trails a melt pool formed by the energy emitted from the energy emitter into the material.

Clause 7. The additive manufacturing system of any of Clauses 1-6, wherein the ultrasonic laser emitter is spaced apart from the material.

Clause 8. The additive manufacturing system of any of Clauses 1-7, wherein the ultrasonic laser emitter follows behind the energy emitter.

Clause 9. The additive manufacturing system of any of Clauses 1-8, further comprising a housing that couples the additive manufacturing head to the ultrasonic laser emitter.

Clause 10. The additive manufacturing system of any of Clauses 1-9, wherein the additive manufacturing head further comprises one or more nozzles configured to emit the material.

Clause 11. An additive manufacturing method, comprising:

emitting energy, from an energy emitter of an additive manufacturing head, into a material to form one or more portions of a component; and emitting ultrasonic laser energy, from an ultrasonic laser emitter, onto a portion of the material to generate ultrasonic waves in relation to the portion of the material, wherein the ultrasonic waves control development of one or both of microstructure or size of grains in relation to the portion of the material.

Clause 12. The additive manufacturing method of Clause 11, wherein the ultrasonic laser emitter is off-axis from the energy emitter.

Clause 13. The additive manufacturing method of Clauses 11 or 12, wherein the ultrasonic laser emitter is separate and distinct form the energy emitter, wherein the energy emitter is a laser emitter, and the energy is one or more laser beams.

Clause 14. The additive manufacturing method of any of Clauses 11-13, wherein the material is one or both of a powder or a liquid.

Clause 15. The additive manufacturing method of any of Clauses 11-14, wherein said emitting the ultrasonic laser energy comprises emitting the ultrasonic laser energy onto the portion of the material that trails a melt pool formed by the energy emitted from the energy emitter into the material.

Clause 16. The additive manufacturing method of any of Clauses 11-15, wherein the ultrasonic laser emitter is spaced apart from the material.

Clause 17. The additive manufacturing method of any of Clauses 11-16, wherein the ultrasonic laser emitter follows behind the energy emitter.

Clause 18. The additive manufacturing method of any of Clauses 11-17, further comprising coupling the additive manufacturing head to the ultrasonic laser emitter.

Clause 19. The additive manufacturing method of any of Clauses 11-18, further comprising emitting, from one or more nozzles of the additive manufacturing head, the material.

Clause 20. A directed energy deposition additive manufacturing system, comprising:

an additive manufacturing head including:

one or more nozzles configured to emit a material, wherein the material is one or both of a powder or a liquid; and an energy emitter that is configured to emit one or more laser beams into the material to form one or more portions of a component; and an ultrasonic laser emitter that is separate, distinct, and off-axis from the energy emitter, wherein the ultrasonic laser emitter is spaced apart from the material, wherein the ultrasonic laser emitter is configured to emit ultrasonic laser energy onto a portion of the material to generate ultrasonic waves in relation to the portion of the material, wherein the ultrasonic waves control development of grain microstructure and/or size in relation to the portion of the material, and wherein the ultrasonic laser emitter is configured to emit the ultrasonic laser energy onto the portion of the material that trails a melt pool formed by the one or more laser beams emitted from the energy emitter into the material, As described herein, examples of the present disclosure systems and methods for refining a surface of a material formed through an additive manufacturing process. Further, examples of the present disclosure provide systems and methods for disrupting undesirable grain growth on a material during an additive manufacturing process, such as a directed energy deposition process.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An additive manufacturing system, comprising:
    an additive manufacturing head including an energy emitter that is configured to emit energy into a material to form one or more portions of a component; and
    an ultrasonic laser emitter configured to emit ultrasonic laser energy onto a portion of the material to generate ultrasonic waves in relation to the portion of the material, wherein the ultrasonic waves control development of one or both of microstructure or size of grains in relation to the portion of the material, and
    wherein the ultrasonic laser emitter is configured to emit the ultrasonic laser energy onto the portion of the material that trails a melt pool formed by the energy emitted from the energy emitter into the material.

2. The additive manufacturing system of claim 1, wherein the ultrasonic laser emitter is off-axis from the energy emitter.

3. The additive manufacturing system of claim 1, wherein the ultrasonic laser emitter is separate and distinct from the energy emitter.

4. The additive manufacturing system of claim 1, wherein the energy emitter is a laser emitter, and the energy is one or more laser beams.

5. The additive manufacturing system of claim 1, wherein the material is one or both of a powder or a liquid.

6. The additive manufacturing system of claim 1, wherein the ultrasonic laser emitter is spaced apart from the material.

7. The additive manufacturing system of claim 1, wherein the ultrasonic laser emitter follows behind the energy emitter.

8. The additive manufacturing system of claim 1, further comprising a housing that couples the additive manufacturing head to the ultrasonic laser emitter.

9. The additive manufacturing system of claim 1, wherein the additive manufacturing head further comprises one or more nozzles configured to emit the material.

10. The additive manufacturing system of claim 1, wherein the ultrasonic laser emitter emits the ultrasonic laser energy as a 1 nanosecond pulsed laser beam having a 1 micro wavelength.

11. The additive manufacturing system of claim 1, wherein the material is a powder or a liquid, and wherein the melt pool is formed by the powder or the liquid within the energy emitted by the energy emitter.

12. An additive manufacturing method performed by an additive manufacturing system comprising an additive manufacturing head including an energy emitter that is configured to emit energy into a material to form one or more portions of a component, and an ultrasonic laser emitter configured to emit ultrasonic laser energy onto a portion of the material to generate ultrasonic waves in relation to the portion of the material, wherein the ultrasonic laser emitter is configured to emit the ultrasonic laser energy onto the portion of the material that trails a melt pool formed by the energy emitted from the energy emitter into the material, the additive manufacturing method comprising:
    emitting energy, from the energy emitter of the additive manufacturing head, into the material to form the one or more portions of the component; and
    emitting the ultrasonic laser energy, from the ultrasonic laser emitter, onto the portion of the material to generate the ultrasonic waves in relation to the portion of the material, wherein the ultrasonic waves control development of one or both of microstructure or size of grains in relation to the portion of the material,
    wherein said emitting the ultrasonic laser energy comprises emitting the ultrasonic laser energy onto the portion of the material that trails the melt pool formed by the energy emitted from the energy emitter into the material.

13. The additive manufacturing method of claim 12, wherein the ultrasonic laser emitter is off-axis from the energy emitter.

14. The additive manufacturing method of claim 12, wherein the ultrasonic laser emitter is separate and distinct from the energy emitter, wherein the energy emitter is a laser emitter, and the energy is one or more laser beams.

15. The additive manufacturing method of claim 12, wherein the material is one or both of a powder or a liquid.

16. The additive manufacturing method of claim 12, wherein the ultrasonic laser emitter is spaced apart from the material.

17. The additive manufacturing method of claim 12, wherein the ultrasonic laser emitter follows behind the energy emitter.

18. The additive manufacturing method of claim 12, further comprising coupling the additive manufacturing head to the ultrasonic laser emitter.

19. The additive manufacturing method of claim 12, further comprising emitting, from one or more nozzles of the additive manufacturing head, the material.

20. The additive manufacturing method of claim 12, wherein said emitting the ultrasonic laser energy comprises emitting the ultrasonic laser energy as a 1 nanosecond pulsed laser beam having a 1 micro wavelength.

21. A directed energy deposition additive manufacturing system, comprising:
    an additive manufacturing head including:
        one or more nozzles configured to emit a material, wherein the material is one or both of a powder or a liquid; and
        an energy emitter that is configured to emit one or more laser beams into the material to form one or more portions of a component; and
    an ultrasonic laser emitter that is separate, distinct, and off-axis from the energy emitter, wherein the ultrasonic laser emitter is spaced apart from the material, wherein the ultrasonic laser emitter is configured to emit ultrasonic laser energy onto a portion of the material to generate ultrasonic waves in relation to the portion of the material, wherein the ultrasonic waves control development of one or both of microstructure or size of grains in relation to the portion of the material, and wherein the ultrasonic laser emitter is configured to emit the ultrasonic laser energy onto the portion of the material that trails a melt pool formed by the one or more laser beams emitted from the energy emitter into the material.

* * * * *